United States Patent
Hsu et al.

(10) Patent No.: US 10,216,223 B2
(45) Date of Patent: Feb. 26, 2019

(54) HINGE ASSEMBLY

(71) Applicant: FIRST DOME CORPORATION, New Taipei (TW)

(72) Inventors: An-Szu Hsu, New Taipei (TW); Hsu-Hong Yao, New Taipei (TW)

(73) Assignee: First Dome Corporation, New Taipei (TW)

( * ) Notice: Subject to any disclaimer, the term of this patent is extended or adjusted under 35 U.S.C. 154(b) by 150 days.

(21) Appl. No.: 15/600,949

(22) Filed: May 22, 2017

(65) Prior Publication Data

US 2018/0150103 A1    May 31, 2018

(30) Foreign Application Priority Data

Nov. 30, 2016  (TW) .............................. 105218295 A

(51) Int. Cl.
| | | |
|---|---|---|
| *E05D 3/14* | (2006.01) | |
| *G06F 1/16* | (2006.01) | |
| *E05D 15/40* | (2006.01) | |
| *E05D 15/44* | (2006.01) | |

(52) U.S. Cl.
CPC ......... *G06F 1/1618* (2013.01); *E05D 15/403* (2013.01); *E05D 15/445* (2013.01); *G06F 1/166* (2013.01); *G06F 1/1626* (2013.01); *G06F 1/1641* (2013.01); *E05D 15/44* (2013.01); *E05Y 2900/606* (2013.01); *G06F 1/1637* (2013.01); *G06F 1/1654* (2013.01)

(58) Field of Classification Search
CPC ......... E05D 15/04; E05D 15/30; E05D 15/40; E05D 15/44; E05D 3/14; Y10T 16/5474; Y10T 16/547; Y10T 16/5476

USPC .................................................. 16/368, 370
See application file for complete search history.

(56) References Cited

U.S. PATENT DOCUMENTS

| | | | | |
|---|---|---|---|---|
| 6,175,991 | B1 * | 1/2001 | Driesman | E05D 3/147 16/366 |
| 6,499,189 | B2 * | 12/2002 | Kondo | E05D 3/06 16/239 |
| 6,892,423 | B2 * | 5/2005 | Cheal | E05D 3/145 16/286 |
| 9,822,567 | B1 * | 11/2017 | Lin | E05D 11/06 |
| 2008/0172833 | A1 * | 7/2008 | Migli | E05D 15/40 16/277 |
| 2010/0269293 | A1 * | 10/2010 | Wisniewski | E05D 3/14 16/250 |

* cited by examiner

*Primary Examiner* — Emily M Morgan
(74) *Attorney, Agent, or Firm* — Michael Best & Friedrich LLP

(57) ABSTRACT

A hinge assembly includes first and second linkage rods pivoted to a base seat, a cam connected to the first and second linkage rods, and a kickstand support pivoted to the cam. A latch is disposed in the cam. When the first and second linkage rods, the kickstand support, and the cam are received inside the base seat, the latch is in a first locking position, where the latch locks rotational movement of the kickstand support relative to the cam. When the second linkage rod moves outward of the base seat and brings the first linkage rod to rotate relative to the cam, the latch is pushed by the kickstand support to move into a second locking position, where the first linkage rod is limited from rotating relative to the cam.

8 Claims, 15 Drawing Sheets

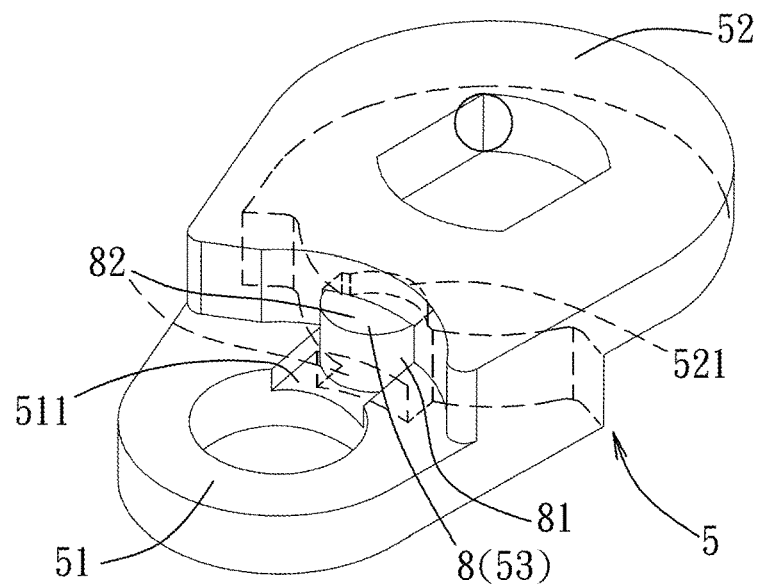
F I G. 7
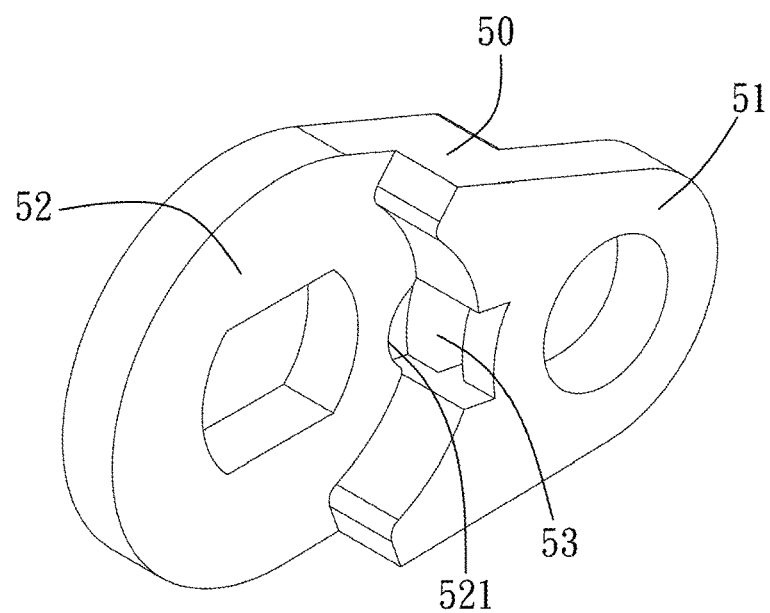
F I G. 7A

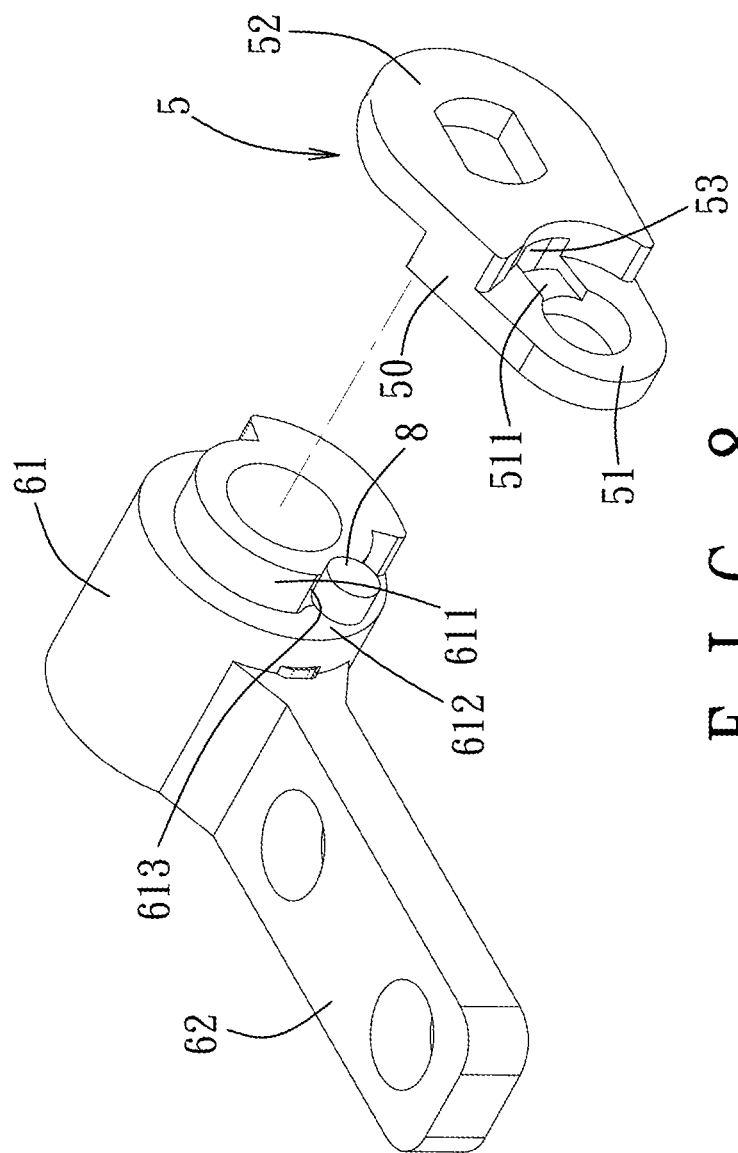
F I G. 8

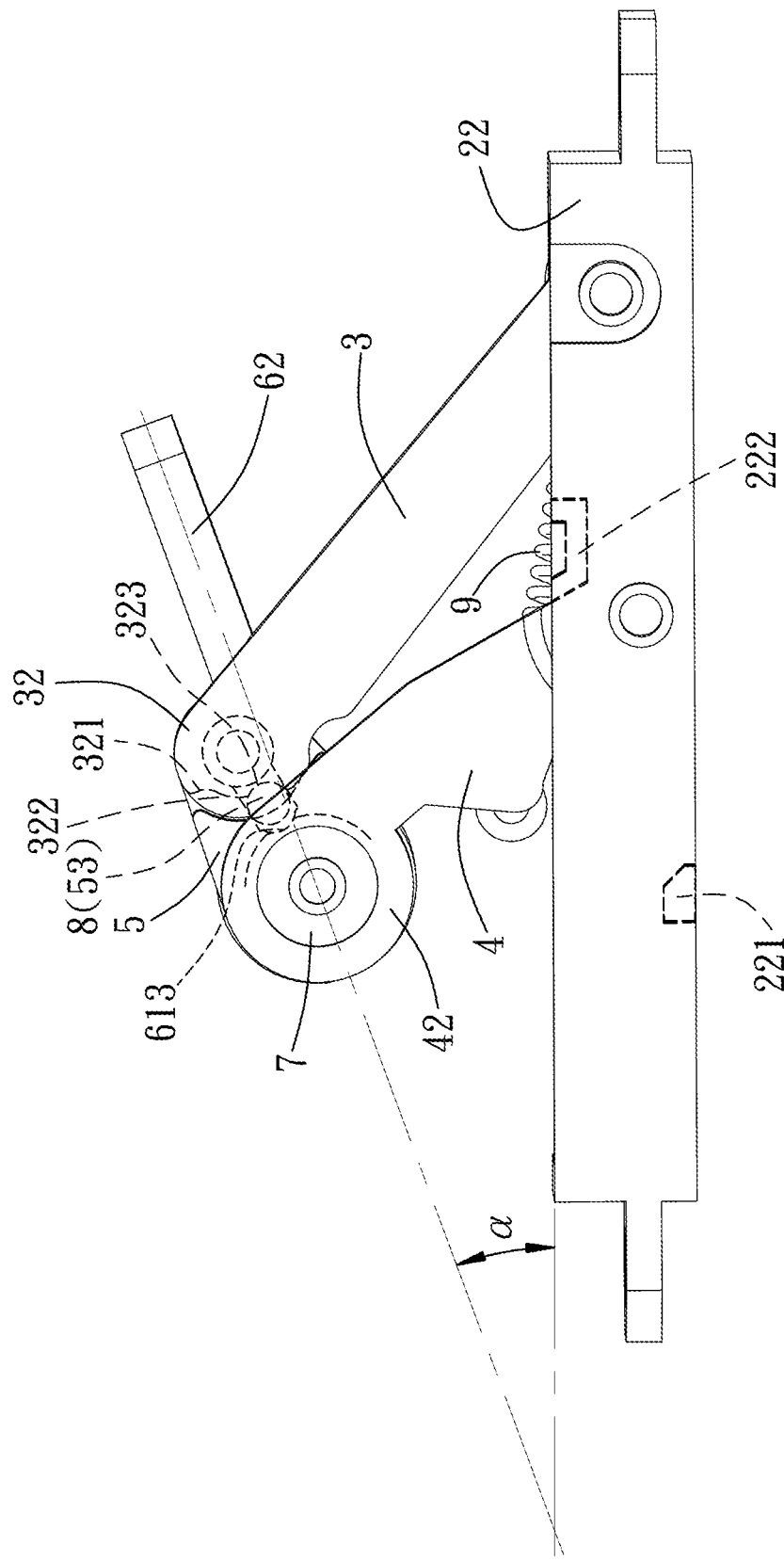
F I G. 10B

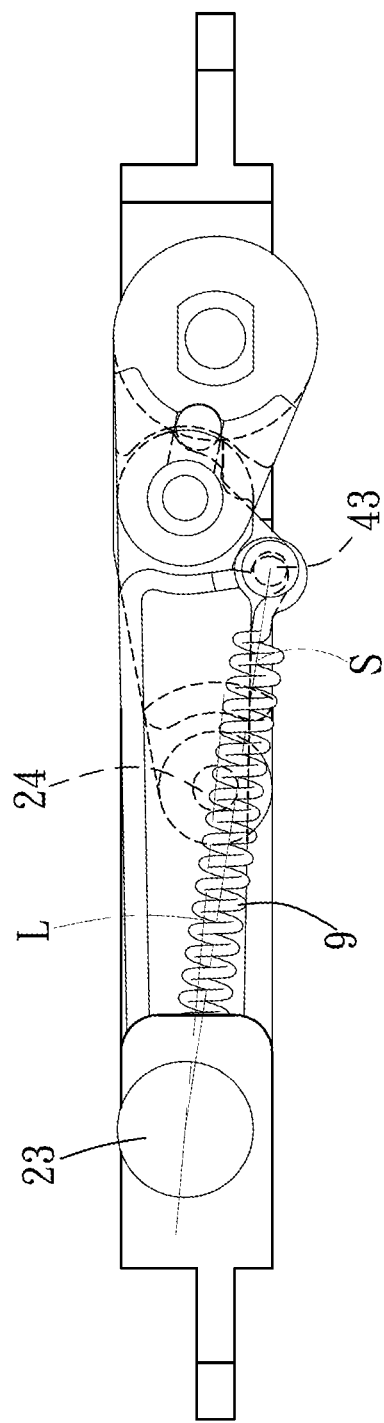
F I G. 12

HINGE ASSEMBLY

CROSS-REFERENCE TO RELATED APPLICATION

This application claims priority to Taiwanese Patent Application No. 105218295, filed on Nov. 30, 2016.

FIELD

The disclosure relates to a hinge assembly, and more particularly to a hinge assembly for a tablet computer.

BACKGROUND

Referring to FIG. 1, an existing tablet computer 1 includes a device body 11 and a backplate 12 mounted on the device body 11. The backplate 12 includes a casing part 121, a kickstand 122 pivotally connected to the casing part 121 through two conventional hinge assemblies 123. When the kickstand 122 is rotated relative to the casing part 121, the hinge assemblies 123 can produce a friction force to position the kickstand 122 by a predetermined angle relative to the casing part 121. As such, the device body 11 can be placed on and inclined to a desktop There is another tablet computer which has the kickstand 122 and the hinge assemblies 123. The kickstand 122 is interlockingly connected to the device body of the another tablet computer, and each hinge assembly 123 further has a spring. When the kickstand 122 is pulled and disengaged from the device body to move to a spring-out state, the spring of each hinge assembly 123 produces a torque to automatically position the kickstand 122 by a predetermined angle relative to the device body. Thereafter, a desired angle can be adjusted between the kickstand 122 and the device body.

However, when the kickstand 122 is in a fully folded state, as it is subjected to the torque created by the springs of the hinge assemblies 123, the kickstand 122 is slightly bulged outward, thereby adversely affecting the aesthetic appearance of the tablet computer. Further, when rotating the kickstand 122 between the fully folded state and the spring-out state, because one side of the kickstand 122 is close to the computer body of the tablet computer, friction and hence abrasion can occur between the kickstand 122 and the computer body. In addition, automatic rotation of the kickstand 122 by the springs of the hinge assemblies 123 may be unsmooth due to the friction which counteracts the torque created by the springs.

SUMMARY

Therefore, an object of the disclosure is to provide a hinge assembly that can alleviate at least one drawback of the prior art.

According to the disclosure, a hinge assembly includes a base unit, a first linkage rod, a first fixing shaft, a second linkage rod, a second fixing shaft, a cam, a kickstand support and a toque unit.

The base unit includes a base seat defining a receiving space.

The first linkage rod includes a first pivot end and a first swingable end opposite to the first pivot end. The first swingable end has a first abutment surface that defines a first sliding groove and a first recess communicating with the first sliding groove.

The first fixing shaft is mounted to the base seat and extends through the first pivot end to allow the first linkage rod to rotate relative to the base seat.

The second linkage rod includes a second pivot end and a second swingable end opposite to the second pivot end.

The second fixing shaft connects the second pivot end and the base seat to allow the second linkage rod to rotate relative to the base seat.

The cam includes a first pivot portion pivotally connected to the first swingable end of the first linkage rod, a second pivot portion pivotally connected to the second swingable end of the second linkage rod, and a latch hole formed between the first and second pivot portions.

The kickstand support includes a hollow pivot body pivotally connected to the second pivot portion of the cam. The hollow pivot body has a second abutment surface that defines a second sliding groove, and a second recess communicating with the second sliding surface.

The torque unit includes a torque spindle extending through the second swingable end of the second linkage rod, the second pivot portion of the cam, and the hollow pivot body of the kickstand support, and a torque plate set interferentially fitted into the hollow pivot body and interferentially sleeved on the torque spindle. The torque plate set and the torque spindle cooperatively producing a friction force to position the kickstand support when the kickstand support is rotated together with the torque plate set by a predetermined angle relative to the torque spindle.

The latch is disposed in the latch hole.

The latch hole is interposed between the first and second abutment surfaces of the first linkage rod and the kickstand support. The latch extends into the first and second abutment surfaces.

When the first and second linkage rods, the kickstand support, and the cam are received in the receiving space, the latch hole is communicated with the second recess, and the latch is in a first locking position, where the latch extends into the second recess to lock rotational movement of the kickstand support relative to the cam.

When the second linkage rod is rotated outward of the receiving space by a torque and brings the first linkage rod to rotate relative to the cam until the latch hole communicates with both of the first and second recesses, the latch is pushed by the second abutment surface of the kickstand support to leave the second recess of the kickstand support, and moves into the first recess of the first linkage rod, thereby placing the latch in a second locking position, where the first linkage rod is limited from rotating relative to the cam.

BRIEF DESCRIPTION OF THE DRAWINGS

Other features and advantages of the disclosure will become apparent in the following detailed description of the embodiment with reference to the accompanying drawings, of which:

FIG. 7 illustrates the latch disposed in the cam;

FIG. 7A is a perspective view of the cam;

FIG. 8 is an exploded view illustrating the kickstand support, the latch and the cam of the embodiment;

FIG. 10B is similar to FIG. 10A, but illustrates the latch beginning to move from the first locking position to a second locking position when the kickstand support is in the spring out state;

FIG. 12 illustrates an axial line of a helical resilient member is below a connecting line (L)

DETAILED DESCRIPTION

Figure 1:
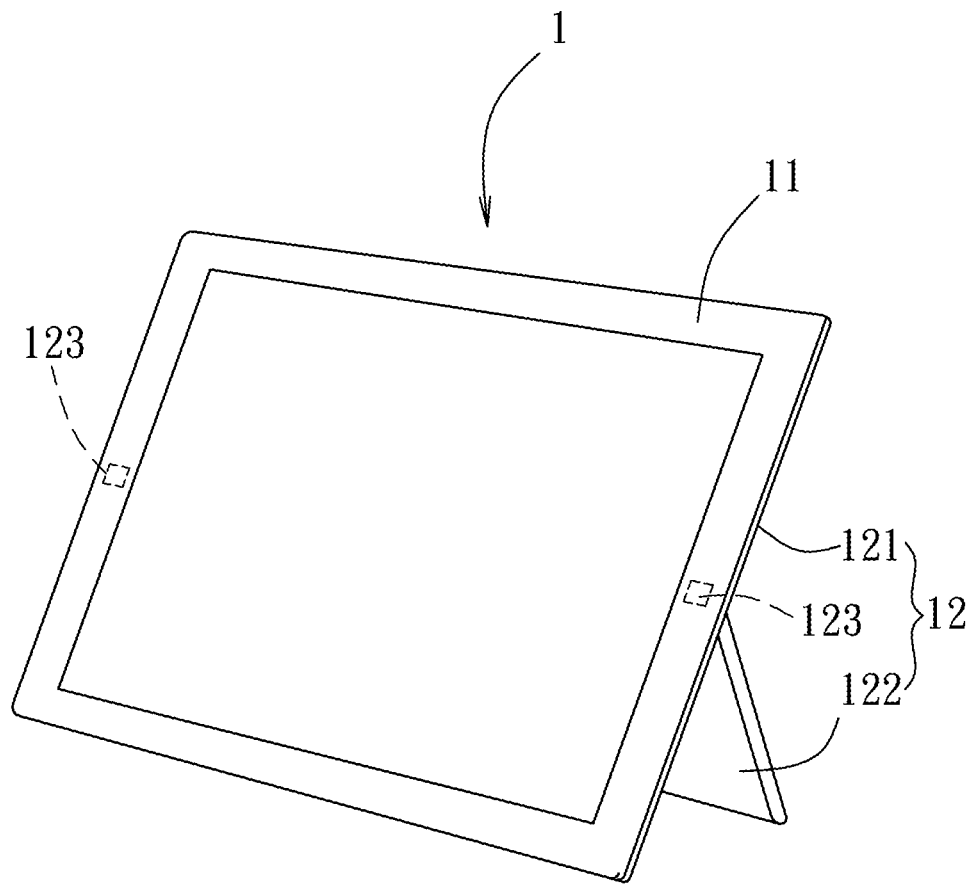
FIG. 1 illustrates an existing tablet computer.
Figure 2:
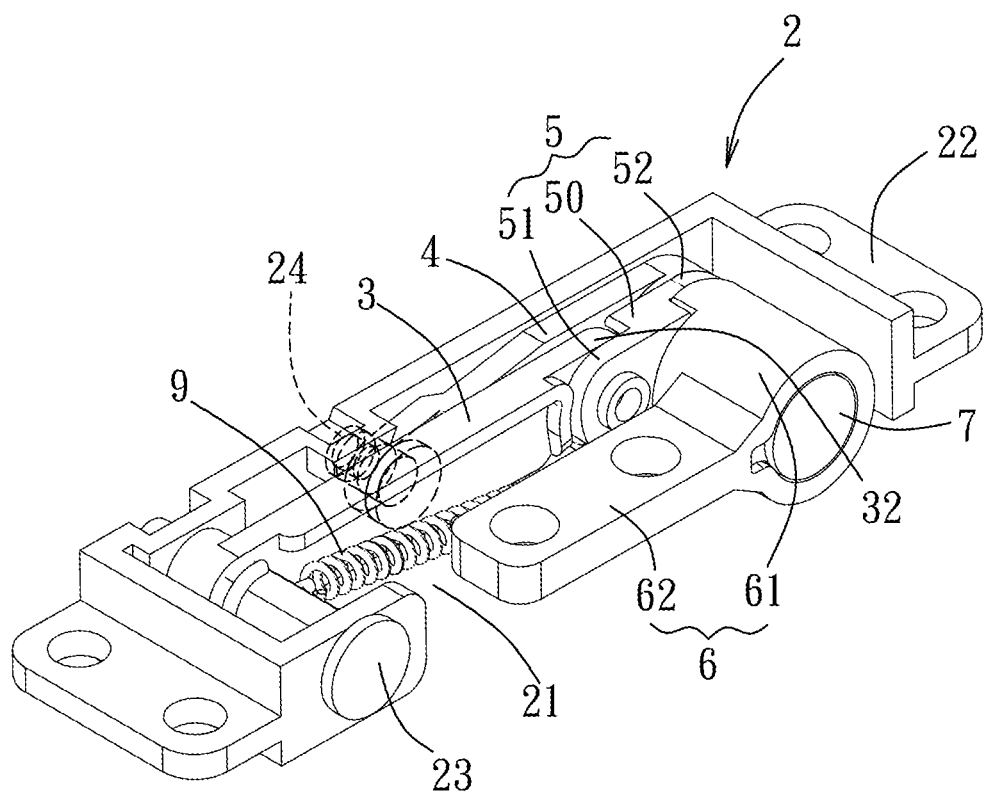
FIG. 2 illustrates a hinge assembly according to an embodiment of the present disclosure.
Figure 3:
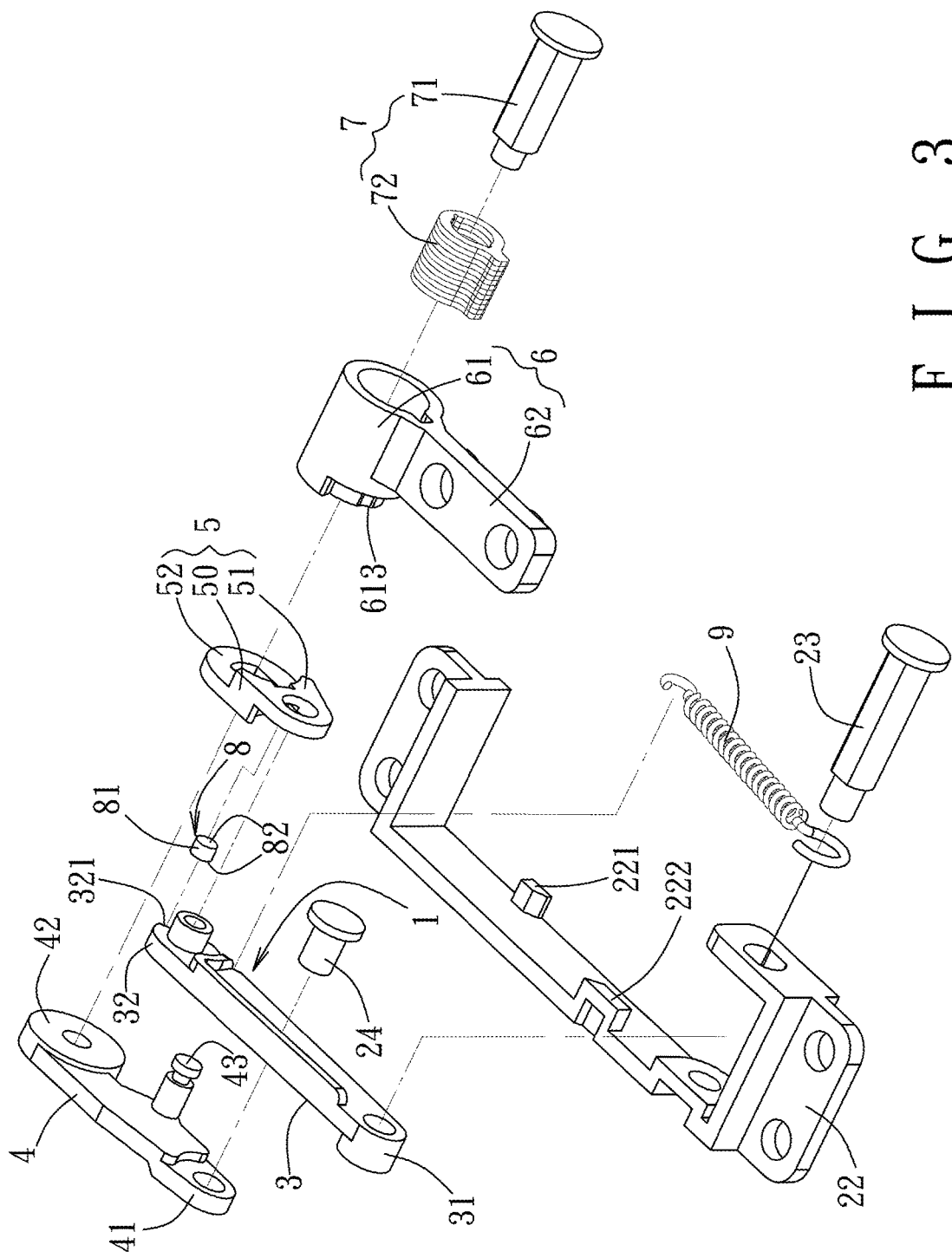
FIG. 3 is an exploded perspective view, illustrating the hinge assembly of the embodiment.

Referring to FIGS. 2 and 3, a hinge assembly according to an embodiment of the present disclosure includes a base unit 2, a first linkage rod 3, a first fixing shaft 23, a second linkage rod 4, a second fixing shaft 24, a cam 5, a kickstand support 6, a torque unit 7, a latch 8 and a helical resilient member 9.

The base unit 2 includes a base seat 22 defining a receiving space 21. The base seat 22 has a first stop 221 and a second stop 222.

Figure 4:
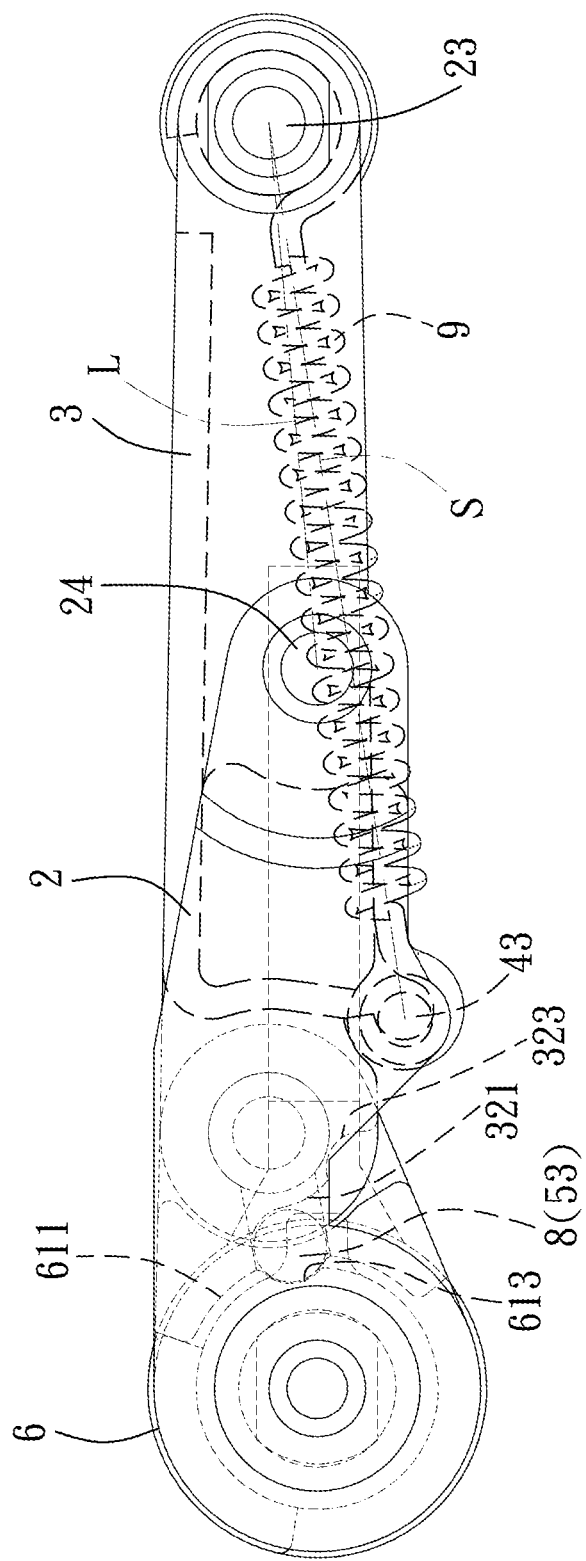
FIG. 4 is a side view of the embodiment, illustrating a kickstand support received in a base unit, and a latch placed in a first locking position and between a first abutment surface of a first linkage rod and a second abutment surface of the kickstand support.
Figure 5:
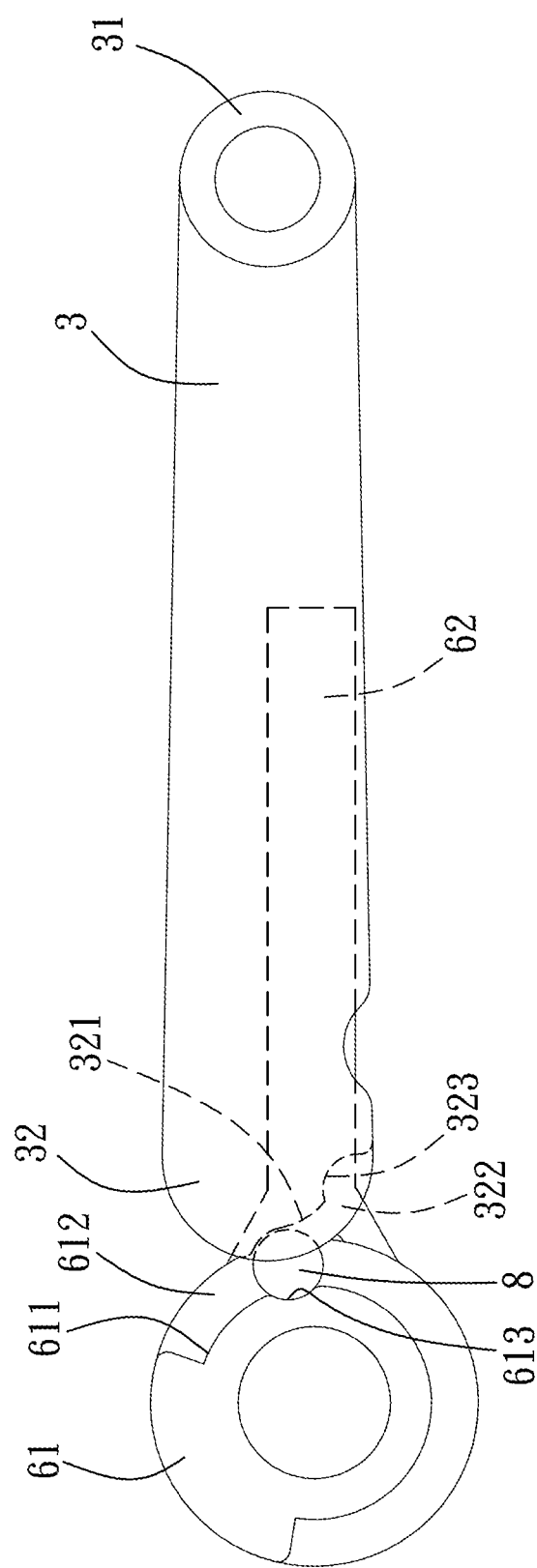
FIG. 5 is the same view as FIG. 4, but omitting the components other than the kickstand support, the latch and the first linkage rod of the embodiment.
Figure 6:
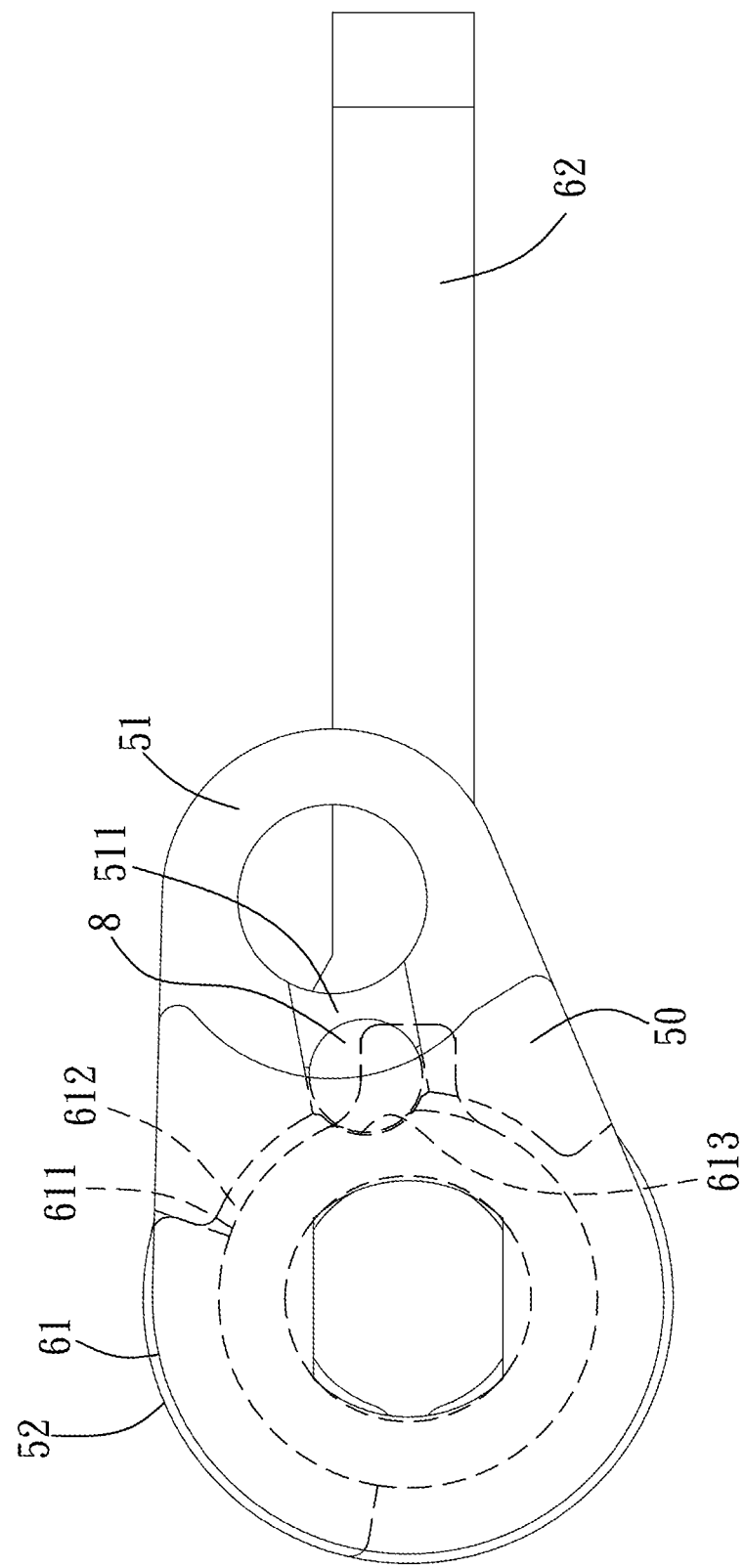
FIG. 6 is the same view as FIG. 4, but omitting the components other than the latch, the kickstand support, and the cam.

Referring to FIGS. 4 and 5, in combination with FIG. 3, the first linkage rod 3 includes a first pivot end 31 and a first swingable end 32 opposite to the first pivot end 31. The first swingable end 32 has a first abutment surface 321 that defines a first sliding groove 322 and a first recess 323 communicating with the first sliding groove 322. In this embodiment, the first linkage rod 3 is a flattened rod.

With reference back to FIGS. 2 and 3, the first fixing shaft 23 is mounted to the base seat 22 and extends through the first pivot end 31 of the first linkage rod 3 to allow the first linkage rod 3 to rotate relative to the base seat 22.

The second linkage rod 4 includes a second pivot end 41, a second swingable end 42 opposite to the second pivot end 41, and a connecting rod 43 disposed between the second pivot end 41 and the second swingable end 42.

The second fixing shaft 24 connects the second pivot end 41 and the base seat 22 to allow the second linkage rod 4 to rotate relative to the base seat 22. In this embodiment, the second linkage rod 4 is limited to rotate relative to the base seat 22 by the first and second stops 221, 222, which will be described in details hereinafter.

Figure 9:
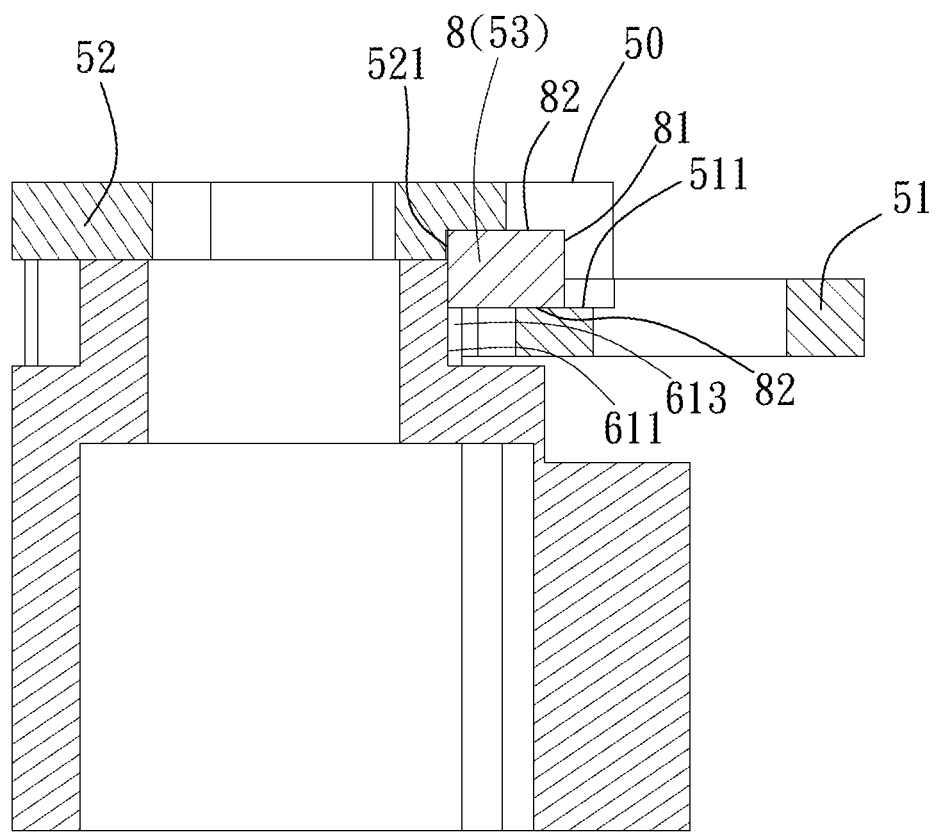
FIG. 9 is a sectional view showing the kickstand support, the latch and the cam of the embodiment.

Referring to FIGS. 6 to 9, in combination with FIGS. 2 and 3, the cam 5 includes a mid portion 50, a first pivot portion 51 and a second pivot portion 52. The first and second pivot portions 51, 52 are respectively connected to two opposite ends of the mid portion 50 and are parallel and offset from each other. The mid portion 50 has a latch hole 53 formed between the first and second pivot portion 51, 52. The first pivot portion 51 is pivotally connected to the first swingable end 32 of the first linkage rod 3. The second pivot portion 52 is pivotally connected to the second swingable end 42 of the second linkage rod 4. As best shown in FIG. 9, the first pivot portion 51 has a placement surface 511 partially bordering the latch hole 53, and the second pivot portion 52 has a blocking surface 521 partially bordering the latch hole 53.

With reference back to FIGS. 3 to 5, the kickstand support 6 includes a hollow pivot body 61 and a kickstand attachment portion 62. The hollow pivot body 61 is pivotally connected to the second pivot portion 52 of the cam 5. The hollow pivot body 61 has a second abutment surface 611 that defines a second sliding groove 612, and a second recess 613 communicating with the second sliding surface 612. The kickstand attachment portion 62 extends radially and outwardly from the hollow pivot body 61. As shown in FIGS. 2 and 4, the mid portion 50 of the cam 5 is interposed between the hollow pivot body 61 and the first swingable end 32 of the first linkage rod 3, so that the latch hole 53 is interposed between the first and second abutment surfaces 321, 611 of the first linkage rod 3 and the kickstand support 6.

Referring back to FIGS. 2 and 3, the torque unit 7 includes a torque spindle 71 extending through the second swingable end 42 of the second linkage rod 4, the second pivot portion 52 of the cam 5, and the hollow pivot body 61 of the kickstand support 6, and a torque plate set 72 interferentially fitted into the hollow pivot body 61 and interferentially sleeved on the torque spindle 71. The torque plate set 72 and the torque spindle 71 cooperatively produce a friction force to position the kickstand support 6 when the kickstand support 6 is rotated together with the torque plate set 72 by a predetermined angle relative to the torque spindle 71.

Referring back to FIGS. 8 and 9, in combination with FIGS. 3 to 7, the latch 8 is disposed in and extends outward from the latch hole 53 into the second abutment surface 611 of the kickstand support 6 and the first abutment surface 321 of the first linkage rod 3. As shown in FIG. 3, the latch 8 is a rounded piece that has a rounded surface 81, and two flat end faces 82 respectively connected to two opposite ends of the rounded surface 81. The placement surface 511 of the cam 5 is in contact with one of the end faces 82, and the blocking surface 521 of the cam 5 is in contact with a part of the rounded surface 81 proximate to the other one of the end faces 82.

Referring back to FIGS. 3 and 4, the helical resilient member 9 has two opposite ends respectively connected to the first fixing shaft 23 and the connecting rod 43.

As shown in FIGS. 2, 3, 12 and 13, the first and second fixing shafts 23, 24 and the connecting rod 43 are parallel to each other, and are located at three different positions corresponding to three apexes of a triangle. A distance between the first and second fixing shafts 23, 24 is shorter than a distance between the first fixing shaft 23 and the connecting rod 43. When the first and second linkage rods 3, 4, the kickstand support 6, and the cam 5 are received in the receiving space 21, the latch hole 53 is communicated with the second recess 613 (see FIG. 4, 5), and the latch 8 is in a first locking position, where the latch 8 extends into the second recess 613 to lock rotational movement of the kickstand support 6 relative to the cam 5. On the other hand, when the kickstand support 6 is placed in the receiving space 21, an axial line (S) of the helical resilient member 9 extends below a connecting line (L) that interconnects the first and second fixing shafts 23, 24, and the helical resilient member (9) produces a downward force to pull the second linkage rod 4 downward, and the latch 8 is in the first locking position, so that the kickstand support 6 is held in the receiving space 21. Meanwhile, the first stop 221 prevents the second linkage rod 4 from moving further downward relative to the base seat 22.

Figure 10A:
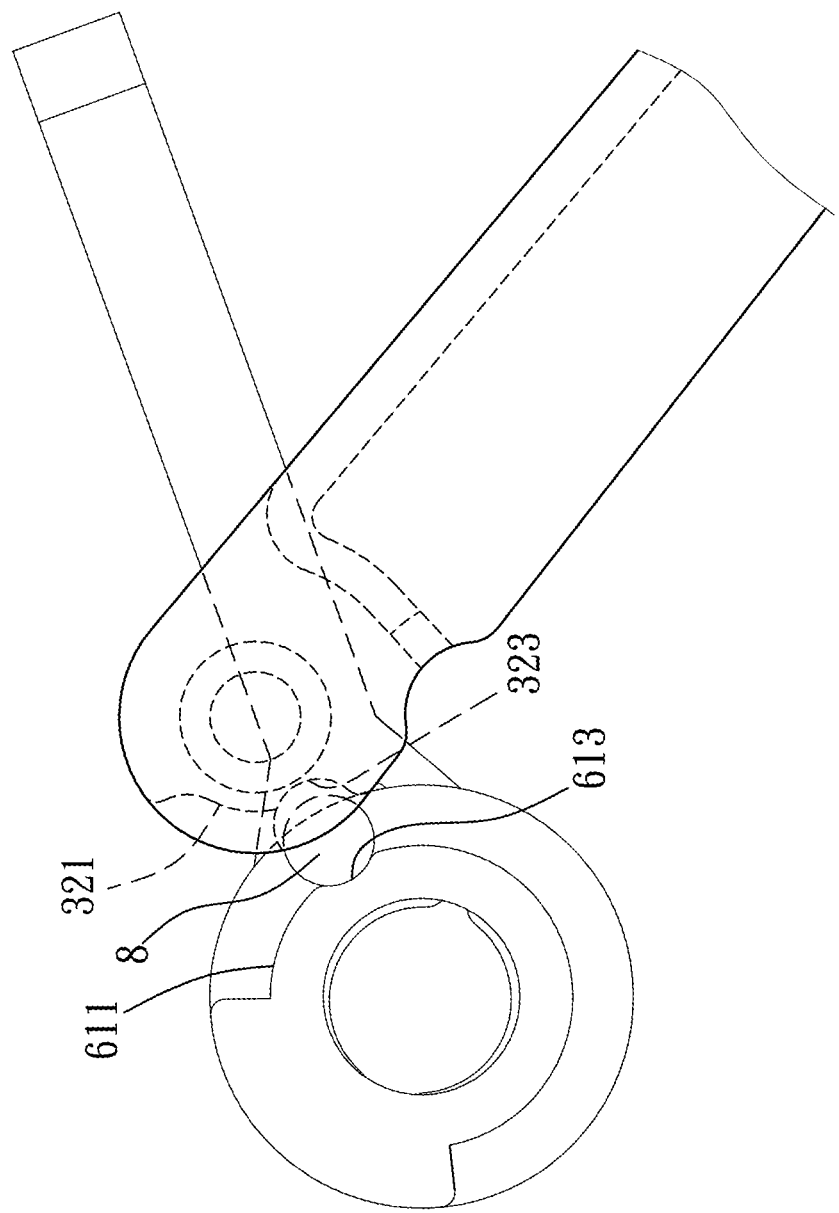
FIG. 10A is a fragmentary view of the embodiment, illustrating the positional relation of the kickstand support and the first linkage rod when the latch is in the first locking position and when the kickstand support is in a spring out state.
Figure 10C:
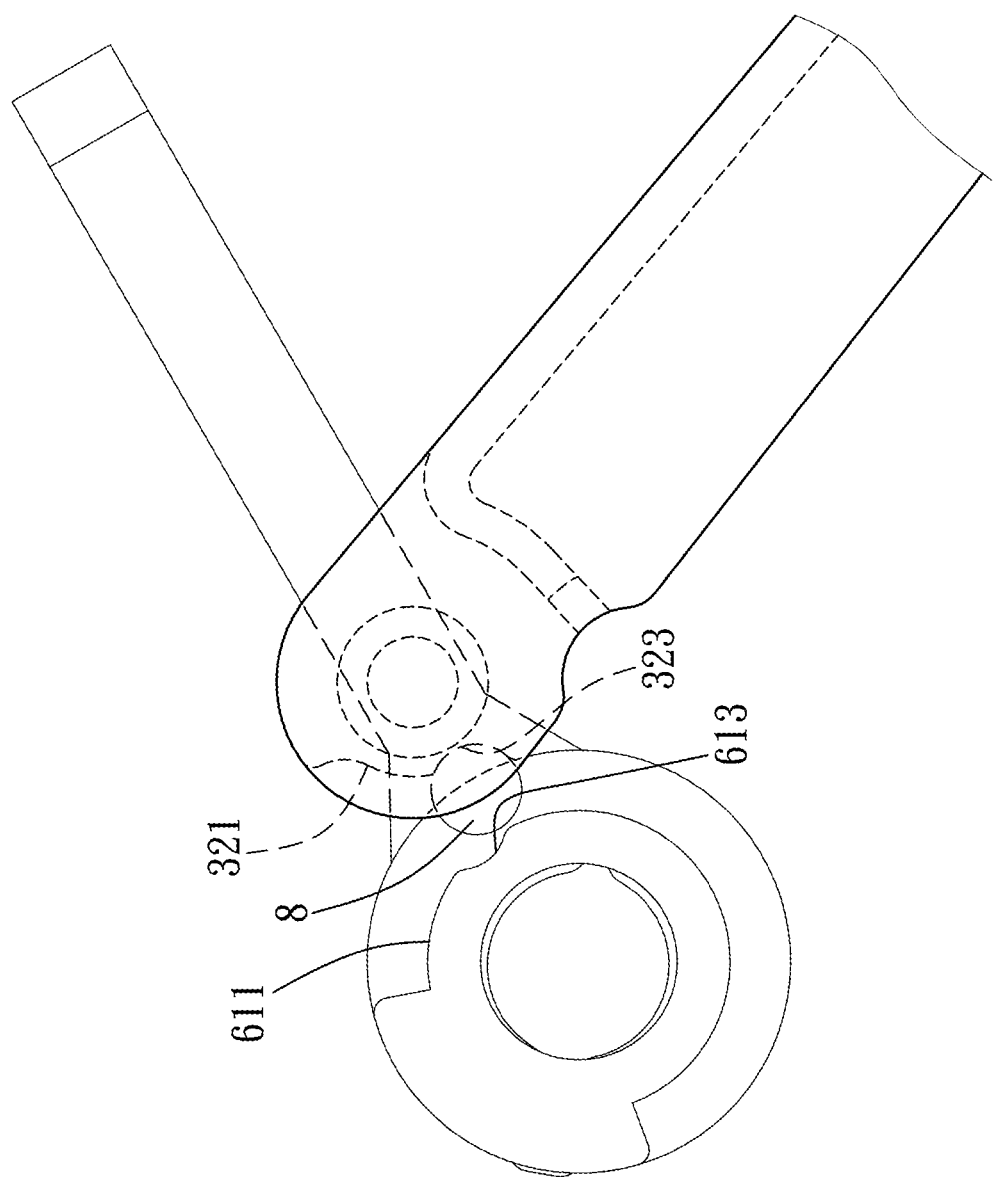
FIG. 10C illustrates the latch in the second locking position.

Referring to FIGS. 10A to 10C, 11 and 13, in combination with FIGS. 2 and 3, when the second linkage rod 4 is rotated outward of the receiving space 21 by a torque created by the helical resilient member 9, it brings the first linkage rod 3 to rotate relative to the cam 5 until the latch hole 53 communicates with both of the first and second recesses 323, 613 as shown in FIGS. 10A and 10B. The latch 8 is thus pushed by the second abutment surface 611 of the kickstand support 6 to leave the second recess 613 of the kickstand support 6 as shown in FIGS. 10B to 10C. The latch 8 slides on the placement surface 511 to move away from said blocking surface 521 and into the first recess 323 of the first linkage rod 3, thereby placing the latch 8 in a second locking position, where the first linkage rod 3 is limited from rotating relative to the cam 5 while the kickstand support 6 is allowed to rotate relative to the cam 5. When the kickstand support 6 together with the second linkage rod 4 is pulled upward and outward of the receiving space 21, because the axial line (S) of the helical resilient member 9 rises upward to lie above the connecting line (L), the helical resilient member 9 produces a force to pull the second linkage rod 4 upwardly together with the first linkage rod 3, thereby moving the latch 8 into the second locking position. The second block 222 prevents the second linkage rod 4 from moving further upward relative to the base seat 22 at this state.

Referring back to FIGS. 3, 4, 9 and 12, the base seat 22 is configured to be mounted on a tablet computer (not shown), and the kickstand attachment portion 62 of the kickstand support 6 is configured for connection with and for rotation together with a kickstand (not shown) of the tablet computer. The kickstand can be flush with a back surface of the tablet computer in a folded state when the angle (□) between the kickstand support 6 and the base seat 22 is 0 degrees because the axial line (S) of the helical resilient member 9 lies below the connecting line (L) and because the resilient member 9 pulls the second linkage rod 4 downward. When the kickstand is turned slightly upward such that an angle (□) between the kickstand support 6 and the base seat 22 reaches 0.4 degrees, the helical resilient member 9 begins to rise higher than the connecting line (L) and thus produces its upward pulling force, which causes the second linkage rod 4 to spring out automatically and to rotate the first linkage rod 3 relative to the cam 5 until the latch 8 is placed in the second position. Because relative rotation between the kickstand support 6 and the cam 5 does not occur, the spring out movement of the kickstand support 6 is not interfered by the friction force produced by the torques plate set 72 and the torque spindle 71.

Figure 11:
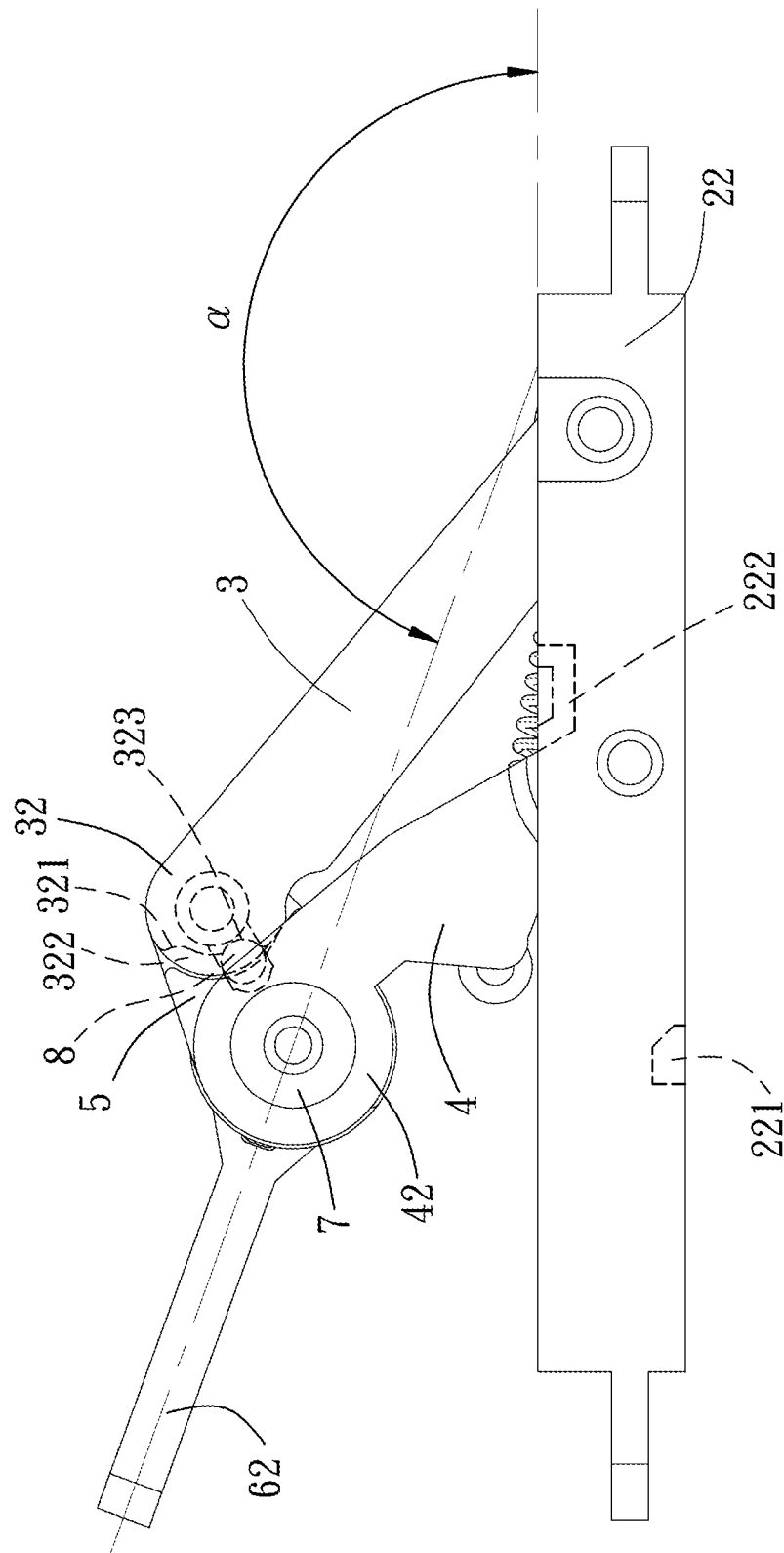
FIG. 11 illustrates the kickstand support being rotated further from the spring out state.
Figure 13:
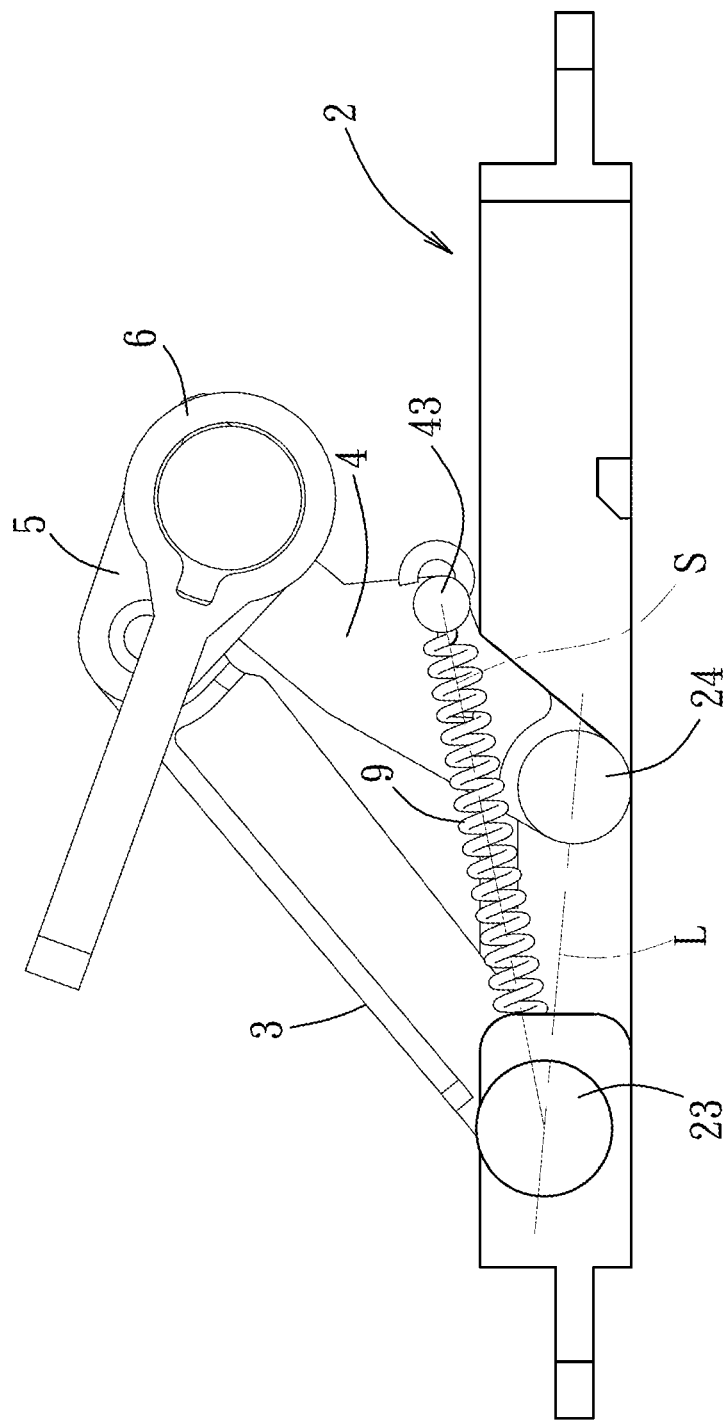
FIG. 13 illustrates the axial line of the helical resilient member is above the connecting line (L).

After the second block 222 prevents the second linkage rod 4 from moving upward relative to the base seat 22, and after the first linkage rod 3 is limited from rotating relative to the cam 5 by the latch 8 in the second locking position, if the kickstand of the tablet computer is further rotated, the kickstand support 6 will be rotated relative to the cam 5, and the kickstand can be positioned by the friction force generated by the torque unit 7. As shown in FIGS. 11 and 13, the kickstand support 6 can be rotated until the angle (□) formed between the kickstand support 6 and the base seat 22 reaches the largest angle of about 160 degrees.

To sum up, the movement of the kickstand support 6 involves two stages. In the first stage, the kickstand support 6 is locked to rotate relative to the cam 5 and springs outward by the action of the helical resilient member 9. At this stage, the latch 8 is in the first locking position, and the first linkage rod 3 rotates relative to the cam 5 without being counteracted by the friction force generated by the torque unit 7. In the second stage, the latch 8 is in the second locking position to limit the first linkage rod 3 from rotating relative to the cam 5, the kickstand support 6 rotates relative to the cam 5 independently of the first linkage rod 3, and the kickstand (not shown) is allowed to rotate without frictioning the back surface of the tablet computer (not shown). In addition, when the axial line (S) of the helical resilient member 9 extends below the connecting line (L), the helical resilient member 9 pulls the second linkage rod 4 downward so that the kickstand support 6 is received in the receiving space 21 without bulging outward. Therefore, the kickstand and the back surface of the tablet computer can be flush with each other to maintain a good aesthetic appearance.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A hinge assembly, comprising:
   a base unit including a base seat defining a receiving space;
   a first linkage rod including a first pivot end and a first swingable end opposite to said first pivot end, said first swingable end having a first abutment surface that defines a first sliding groove and a first recess communicating with said first sliding groove;
   a first fixing shaft mounted to said base seat and extending through said first pivot end to allow said first linkage rod to rotate relative to said base seat;
   a second linkage rod including a second pivot end and a second swingable end opposite to said second pivot end;
   a second fixing shaft connecting said second pivot end and said base seat to allow said second linkage rod to rotate relative to said base seat;
   a cam including a first pivot portion pivotally connected to said first swingable end of said first linkage rod, a second pivot portion pivotally connected to said second swingable end of said second linkage rod, and a latch hole formed between said first and second pivot portions;

a kickstand support including a hollow pivot body pivotally connected to said second pivot portion of said cam, said hollow pivot body having a second abutment surface that defines a second sliding groove, and a second recess communicating with said second sliding surface;

a torque unit including a torque spindle extending through said second swingable end of said second linkage rod, said second pivot portion of said cam, and said hollow pivot body of said kickstand support, and a torque plate set interferentially fitted into said hollow pivot body and interferentially sleeved on said torque spindle, said torque plate set and said torque spindle cooperatively producing a friction force to position said kickstand support when said kickstand support is rotated together with said torque plate set by a predetermined angle relative to said torque spindle; and a latch disposed in said latch hole, wherein said latch hole is interposed between said first and second abutment surfaces of said first linkage rod and said kickstand support, said latch extending into said first and second abutment surfaces, wherein, when said first and second linkage rods, said kickstand support, and said cam are received in said receiving space, said latch hole is communicated with said second recess, and said latch is in a first locking position, where said latch extends into said second recess to lock rotational movement of said kickstand support relative to said cam, and wherein, when said second linkage rod is rotated outward of said receiving space by a torque and brings said first linkage rod to rotate relative to said cam until said latch hole communicates with both of said first and second recesses, said latch is pushed by said second abutment surface of said kickstand support to leave said second recess of said kickstand support, and moves into said first recess of said first linkage rod, thereby placing said latch in a second locking position, where said first linkage rod is limited from rotating relative to said cam.

2. The hinge assembly as claimed in claim 1, wherein said second linkage rod further includes a connecting rod disposed between said second pivot end and said second swingable end, wherein said hinge assembly further includes a helical resilient member having two opposite ends respectively connected to said first fixing shaft and said connecting rod, wherein said first and second fixing shafts and said connecting rod are parallel to each other and are located at three different positions corresponding to three apexes of a triangle, a distance between said first and second fixing shafts being shorter than a distance between said first fixing shaft and said connecting rod, wherein, when said kickstand support is placed in said receiving space, an axial line of said helical resilient member extends below a connecting line that interconnects said first and second fixing shafts, said helical resilient member produces a downward force to pull said second linkage rod downward, and said latch is in the first locking position, so that said kickstand support is held in said receiving space, and wherein, when said kickstand support, together with said second linkage rod, is pulled upward and outward of said receiving space, the axial line of said helical resilient member rises upward to lie above said connecting line, so that said helical resilient member produces a force to pull upward said second linkage rod together with said first linkage rod and so that said latch moves to the second locking position.

3. The hinge assembly as claimed in claim 1, wherein an angle formed between said kickstand support and said base seat is about zero degrees when said latch is at the first position, and an angle formed between said kickstand support and said base seat is about 30 degrees when said latch is at the second locking position.

4. The hinge assembly as claimed in claim 1, wherein said kickstand support further includes a kickstand attachment portion extending radially and outwardly from said hollow pivot body.

5. The hinge assembly as claimed in claim 2, wherein, when an angle formed between said kickstand support and said base seat is greater than 0.4 degrees, said helical resilient member lies above said connecting line and produces a force to pull up said second linkage rod.

6. The hinge assembly as claimed in claim 2, wherein:

said base seat has a first stop and a second stop;

said first stop prevents said second linkage rod from moving downward relative to said base seat when the angle between said kickstand support and said base unit is zero degrees, and when said helical resilient member lies below said connecting line; and said second block prevents said second linkage rod from moving upward relative to said base seat when said helical resilient member lies above said connecting line and when said latch moves to the second locking position.

7. The hinge assembly as claimed in claim 1, wherein said cam further has a mid portion having said latch hole, said first and second pivot portions being respectively connected to two opposite ends of said mid portion and being parallel and offset from each other, said mid portion being interposed between said hollow pivot body of said kickstand support and said first swingable end of said first linkage rod, said latch extending outward from said latch hole into said second abutment surface of said kickstand support and said first abutment surface of said first linkage rod.

8. The hinge assembly as claimed in claim 7, wherein said latch is a rounded piece that has a rounded surface, and two flat end faces respectively connected to two opposite ends of said rounded surface, said first pivot portion having a placement surface partially bordering said latch hole and in contact with one of said flat end faces, said second pivot portion having a blocking surface partially bordering said latch hole and in contact with a part of said rounded surface proximate to the other one of said flat end faces.

* * * * *